United States Patent
Lai et al.

(10) Patent No.: US 10,219,091 B2
(45) Date of Patent: Feb. 26, 2019

(54) DYNAMICALLY CHANGING MASTER AUDIO PLAYBACK DEVICE

(71) Applicant: Bose Corporation, Framingham, MA (US)

(72) Inventors: Trevor Lai, Wayland, MA (US); Gregg Michael Duthaler, Needham, MA (US); Michael Elliot, Grafton, MA (US); Matthew C. Smith, Needham, MA (US); Debasmit Banerjee, Framingham, MA (US); Michael Malone, Uxbridge, MA (US)

(73) Assignee: Bose Corporation, Framingham, MA (US)

( * ) Notice: Subject to any disclaimer, the term of this patent is extended or adjusted under 35 U.S.C. 154(b) by 0 days.

(21) Appl. No.: 15/212,924

(22) Filed: Jul. 18, 2016

(65) Prior Publication Data

US 2018/0020308 A1   Jan. 18, 2018

(51) Int. Cl.
*H04S 3/00* (2006.01)
*G06F 3/16* (2006.01)
(Continued)

(52) U.S. Cl.
CPC .............. *H04S 3/008* (2013.01); *G06F 3/165* (2013.01); *H04L 65/1069* (2013.01);
(Continued)

(58) Field of Classification Search
CPC ........................... H04R 2227/005; G06F 3/165
See application file for complete search history.

(56) References Cited

U.S. PATENT DOCUMENTS

| 5,087,980 A | 2/1992 | Staffer |
| 5,530,859 A | 6/1996 | Tobias, II et al. |

(Continued)

FOREIGN PATENT DOCUMENTS

| JP | 2000-090582 | 3/2000 |
| JP | 2008-522468 | 12/2004 |

(Continued)

OTHER PUBLICATIONS

U.S. Appl. No. 15/087,021, filed Mar. 31, 2016 entitled "Clock Synchronization for Audio Playback Devices" applicant Bose Corporation.

(Continued)

*Primary Examiner* — Mark Fischer
(74) *Attorney, Agent, or Firm* — Brian M. Dingman; Dingman IP Law, PC (57) ABSTRACT

A method for dynamically changing the master audio playback device of a set that includes at least two audio playback devices, wherein one audio playback device of the set is a set master audio playback device that controls the play of audio data by at least one other slave audio playback device of the set. A first slave audio playback device receives its selection as a new recipient of audio data and, in response, the first slave audio playback device is designated as a new set master audio playback device and the set master audio playback device is designated as a new slave audio playback device. The new set master audio playback device controls the play of audio by the new slave audio playback device.

14 Claims, 6 Drawing Sheets

(51) Int. Cl.
*H04L 29/08* (2006.01)
*H04L 29/06* (2006.01)

(52) U.S. Cl.
CPC ...... *H04L 65/4076* (2013.01); *H04L 65/4092* (2013.01); *H04L 67/06* (2013.01); *H04L 67/104* (2013.01); *H04R 2227/005* (2013.01); *H04R 2420/07* (2013.01)

(56) References Cited

U.S. PATENT DOCUMENTS

| | | | |
|---|---|---|---|
| 5,655,144 | A | 8/1997 | Milne et al. |
| 5,951,690 | A | 9/1999 | Baron et al. |
| 5,987,106 | A | 11/1999 | Kitamura |
| 6,134,379 | A | 10/2000 | LaMacchia |
| 6,285,405 | B1 | 9/2001 | Binford, Jr. et al. |
| 6,469,633 | B1 | 10/2002 | Wachter |
| 6,631,410 | B1 | 10/2003 | Kowalski et al. |
| 7,023,833 | B1 | 4/2006 | Aiello et al. |
| 7,391,791 | B2 | 6/2008 | Balassanian et al. |
| 7,483,538 | B2 | 1/2009 | McCarty et al. |
| 7,643,894 | B2 | 1/2010 | Braithwaite et al. |
| 7,917,082 | B2 | 3/2011 | Goldberg et al. |
| 8,054,987 | B2 | 11/2011 | Seydoux |
| 8,234,395 | B2 | 7/2012 | Millington |
| 8,588,949 | B2 | 11/2013 | Lambourne et al. |
| 8,718,537 | B2 | 5/2014 | Sakata et al. |
| 8,788,080 | B1 | 7/2014 | Kallai et al. |
| 8,942,252 | B2 | 1/2015 | Balassanian et al. |
| 9,014,834 | B2 | 4/2015 | Kallai et al. |
| 9,078,072 | B2 | 7/2015 | Sundaresan et al. |
| 9,141,645 | B2 | 9/2015 | Lambourne et al. |
| 9,195,258 | B2 | 11/2015 | Millington |
| 9,202,509 | B2 | 12/2015 | Kallai et al. |
| 9,213,357 | B2 | 12/2015 | Millington |
| 9,219,959 | B2 | 12/2015 | Kallai et al. |
| 2002/0031196 | A1 | 3/2002 | Muller et al. |
| 2002/0067909 | A1 | 6/2002 | Iivonen |
| 2002/0131398 | A1 | 9/2002 | Taylor |
| 2003/0050989 | A1 | 3/2003 | Marinescu et al. |
| 2004/0008661 | A1 | 1/2004 | Myles |
| 2004/0136375 | A1 | 7/2004 | Koguchi |
| 2004/0223622 | A1 | 11/2004 | Lindemann et al. |
| 2004/0234088 | A1 | 11/2004 | McCarty et al. |
| 2004/0249490 | A1 | 12/2004 | Sakai |
| 2006/0013208 | A1 | 1/2006 | Rietschel et al. |
| 2007/0142944 | A1 | 6/2007 | Goldberg et al. |
| 2007/0160225 | A1 | 7/2007 | Seydous |
| 2008/0025535 | A1 | 1/2008 | Rajapakse |
| 2010/0115119 | A1 | 5/2010 | Gallo et al. |
| 2011/0150228 | A1 | 6/2011 | Yoon et al. |
| 2013/0028531 | A1* | 1/2013 | Sato ...................... H04N 19/60 382/233 |
| 2013/0196721 | A1* | 8/2013 | Waterman ............... H04M 1/05 455/575.2 |
| 2013/0316642 | A1* | 11/2013 | Newham ........... H04W 52/0206 455/11.1 |
| 2015/0063588 | A1* | 3/2015 | Kim ........................ H04S 7/301 381/81 |
| 2015/0067054 | A1 | 3/2015 | Yoo et al. |
| 2015/0098576 | A1 | 4/2015 | Sundaresan et al. |
| 2015/0125002 | A1* | 5/2015 | Van Den Nieuwenhuizen ........... H01H 19/635 381/109 |

FOREIGN PATENT DOCUMENTS

| | | |
|---|---|---|
| JP | 2004364171 A | 12/2004 |
| JP | 2006-067074 | 9/2006 |
| JP | 2007271802 A | 10/2007 |
| JP | 2008092546 A | 4/2008 |
| JP | 2008-259104 | 10/2008 |
| JP | 2010252134 A | 11/2010 |
| WO | 96/01540 A2 | 1/1996 |
| WO | 98/56135 A2 | 12/1998 |
| WO | 00/76272 A1 | 12/2000 |
| WO | 01/08366 A1 | 2/2001 |
| WO | 03/058830 A1 | 7/2003 |
| WO | 2009086599 A1 | 7/2009 |
| WO | 2017036524 A1 | 3/2017 |

OTHER PUBLICATIONS

Sang H. Son and Nipun Agarwal; "Synchronization of Temporal Constructs in Distributed Multimedia Systems with Controled Accuracy"; Department of Computer Science, University of Virginia; Charlottesville, VA; pp. 550-555; 1994.
The International Search Report and the Written Opinion of the International Searching Authority dated Oct. 26, 2017 for PCT Application No. PCT/US2017/042573.
Escient; FireBall; DVD and Music Manager; DVDM-100; Installation and User's Guide; Manual No. M22003-01A3; Revision 1.2 Jul., 2004; copyright @2003-2004.
Escient; FireBall; E2 User's Manual; P/N M22004-01A3.
Escient; FireBall; AVX & MX Series User's Manual; P/N: M42001-02A1.
Palenchar, Joseph; Avega Uses Wireless, UPnP to Network Home Speakers; Twice; Jan. 5, 2006; pp. 1-3; downloaded from the internet on Dec. 18, 2017; http://www.twice.com/product/avega-upnp-network-home-speakers-2973.
Phillips, Wes; Avega: Wireless Is More; Stereophile.com; Jan. 4, 2006; downloaded from the internet on Dec. 18, 2017; https://www.stereophile.com/ces2006/010406avega/index.html.
Kobrin, Mike; Avega's Oyster Is a Pearl; Wireless audio doesn't have to sound just so-so anymore; News & Opinion; PCMag.com; Jan. 6, 2006; downloaded from internet Dec. 18, 2017; https://www.pcmag.com/article2/0,2817,1908704.00.asp.
Wilkins, Nathaniel; Escient Fireball DVDM-100 review-CNET; Reviewed Dec. 14, 2004; downloaded from the internet on Dec. 18, 2017; https://www.cnet.com/products/escient-fireball-dvdm-100/review/.
Howard, Bill; Escient FireBall DVDM-100 Review & Rating; PCMag.com; Mar. 16, 2004; downloaded from the internet on Dec. 18, 2017; https://www.pcmag.com/article2/0,2817,1549587,00.asp.
Wilkins, Nathaniel; Escient FireBall E2 Digital Music Server review—CNET; Jun. 14, 2006; downloaded from the internet on Dec. 18, 2017; https://www.cnet.com/products/escient-fireball-e2-400-400gb/review/.
Wilkins, Nathaniel; Escient FireBall E-40 Digital Music Manager review—CNET; Oct. 12, 2003; downloaded from internet on Dec. 18, 2017; https://cnet.com/products/escient-fireball-e-40-digital-music-manager/review/.
Antonoff, Michael; Escient FireBall SE-80 Digital Music Manager; Sound & Vision; Oct. 4, 2005; downloaded form the internet on Dec. 18, 2017; https://www.soundandvision.com/content/escient-fireball-se-80-digital-music-manager.
Digital Trends Staff; Wi-Fi Pearl to be Found in Oyster Speakers?; Digital Trends; posted on Jan. 2, 2006; downloaded from the internet on Dec. 18, 2017; https://www.digitaltrends.com/home-theater/wi-fi-pearl-to-be-found-in-oyster-speakers/.
Wikipedia; Universal Plug and Play; downloaded from the Internet on Jan. 10, 2018; pp. 1-10; https://en.wikipedia.org/wiki/Universal_Plug_and_Play.

* cited by examiner

DYNAMICALLY CHANGING MASTER AUDIO PLAYBACK DEVICE

BACKGROUND

This disclosure relates to dynamically changing the master audio playback device of a set that includes two or more audio playback devices.

Sets of audio playback devices, such as multi-room zones, and groups comprising left-right stereo pairs of devices or multiple devices of a surround sound system, have a master device that ensures that the audio data is played by each device at the appropriate time. In order to accommodate the user's desire to select different audio sources for the zone or group, there should be some means to allow the master device to be changed while the devices are playing audio.

SUMMARY

All examples and features mentioned below can be combined in any technically possible way.

In one aspect, a method for dynamically changing the master audio playback device of a set comprising at least two audio playback devices, wherein one audio playback device of the set is a set master audio playback device that controls the play of audio data by at least one other slave audio playback device of the set, includes receiving at a first slave audio playback device the selection of the first slave audio playback device as a new recipient of audio data, and in response to receiving at the first slave audio playback device the selection of the first slave audio playback device as the new recipient of audio data designating the first slave audio playback device as a new set master audio playback device, and designating the set master audio playback device as a new slave audio playback device, where the new set master audio playback device controls the play of audio by the new slave audio playback device.

Embodiments may include one of the following features, or any combination thereof. The set may include a plurality of audio playback devices. The set may comprise a group comprising at least two group audio playback devices, wherein the group has one group master audio playback device and at least one group slave audio playback device, where the group master audio playback device controls the play of audio by the at least one group slave audio playback device. The group may comprise a left-right stereo pair of audio playback devices. The group may comprise multiple surround sound audio playback devices. The first slave audio playback device may be a group slave audio playback device. The first slave audio playback device may be designated as both the new set master audio playback device and the new group master audio playback device. The new set master audio playback device can distribute audio data to all other audio playback devices of the set, and the group master audio playback device may control the play of audio by all group slave audio playback devices.

Embodiments may include one of the following features, or any combination thereof. The set master device may control the play of audio data that originates from a first audio source, the selection of the new recipient of audio data may comprise selection of audio data from a second audio source that differs from the first audio source, and the new set master device may control the play of audio from the second audio source. The second audio source may comprise a Bluetooth audio data stream from a Bluetooth-enabled source device. Bluetooth audio data may be distributed by the new set master audio playback device to all set slave audio playback devices. The audio data may be distributed to the set slave audio playback devices by one of Bluetooth, WiFi, and via a local access point. The second audio source may comprise an auxiliary audio data input. The first slave audio playback device may comprise a user interface comprising a user-operated switch that when operated initiates a Bluetooth connection between the first slave audio playback device and the second audio source.

In another aspect, an audio playback device that is adapted to become the new set master audio playback device of a set comprising at least two audio playback devices, wherein one audio playback device of the set is an original set master audio playback device that controls the play of audio data by at least one other slave audio playback device of the set, includes a digital-to-analog converter configured to receive an audio stream comprising a digital representation of audio content via a network and convert the audio stream to analog form, an electro-acoustic transducer, a network interface, and a processor coupled to the digital-to-analog converter, the electro-acoustic transducer, and the network interface. The processor is configured to receive the selection of the audio playback device as a new recipient of audio data and in response to receiving the selection of the audio playback device as the new recipient of audio data, designate the audio playback device as the new set master audio playback device, where the new set master audio playback device controls the play of audio by the set slave audio playback devices.

Embodiments may include one of the above and/or below features, or any combination thereof. The set can include a plurality of audio playback devices. The set may comprise a group comprising at least two group audio playback devices, wherein the group has one group master audio playback device and at least one group slave audio playback device, where the group master audio playback device controls the play of audio by the at least one group slave audio playback device. The group may comprise a left-right stereo pair of audio playback devices. The group may comprise multiple surround sound audio playback devices. The audio playback device may comprise a group slave audio playback device. The audio playback device may be designated as both the new set master audio playback device and the new group master audio playback device. The new set master audio playback device may distribute audio data to all other audio playback devices of the set, and the group master audio playback device may control the play of audio by all group slave audio playback devices.

Embodiments may include one of the above and/or below features, or any combination thereof. The set master may control the play of audio data that originates from a first audio source, the selection of the new recipient of audio data may comprise selection of audio data from a second audio source that differs from the first audio source, and the new set master device may control the play of audio from the second audio source. The second audio source may comprise a Bluetooth audio data stream from a Bluetooth-enabled source device. Bluetooth audio data may be distributed by the new set master audio playback device to all set slave audio playback devices. The audio data may be distributed to the set slave audio playback devices by one of Bluetooth, WiFi, and via a local access point. The second audio source may comprise an auxiliary audio data input. The audio playback device may comprise a user interface comprising a user-operated switch that when operated initiates a Bluetooth connection between the audio playback device and the second audio source.

DETAILED DESCRIPTION

Multiple audio playback devices can be organized as a "set" of devices that are synchronized such that the audio is played by each device at the correct time. Synchronization can be facilitated by designating one device of the set as the set master device that distributes the audio to the other set devices and controls the audio playback time of some or all of the other set devices. A "set" of devices can include (or can be) a "zone" of multiple coordinated devices that are typically each playing the same audio content (e.g., devices in different rooms of a home). A "set" can also include (or can be) a "group" of devices, where the devices of a group each synchronously play less than all of the audio content. Two non-limiting examples of a group include a left-right stereo pair (where one device plays the left channel content and the other device plays the right channel content) and a surround sound configuration with at least two (and usually more than two) devices, each of which plays part of the total surround sound content (e.g., the left and right front, center channel, and two surround channels for a 5.1 surround sound system).

The individual audio playback devices (speaker packages) that are part of a set of devices (e.g., comprise a zone and/or group of devices) each have the capability of receiving audio via an auxiliary (Aux) source or via a Bluetooth source, and to redistribute that audio to other audio playback devices via a WiFi network or the like. The auxiliary or Bluetooth input can be selected through physical buttons on the devices. The devices are each individually configured to provide a stereo output. Two devices can be paired together to provide a left-right stereo pair (or "group"), such that each device in such a "group" provides only one channel of the L-R stereo audio. A different group configuration includes multiple devices that are configured as a surround sound system; surround sound systems are known in the art.

When devices are "grouped" in this manner, one of the two or more group devices will serve as a master and the other(s) as slave(s), as further described below. Generally, the master-slave relationship is unknown to the user. However, a problem exists in that all of the devices in a group will have aux-in and Bluetooth buttons that allow a user to select an auxiliary or Bluetooth source for any particular device. So, for example, a user who is completely unaware of the master-slave relationship may attempt to pair a Bluetooth source to a slave device.

In the past, if a slave device of a multi-room "zone" comprising two or more devices synchronously playing the same content was selected to receive input from a Bluetooth source (e.g., by pressing on the Bluetooth button on the top of the slave device housing), then this device would merely break off from the zone and become a stand-alone device with its own audio source. However, in the context of a group it is desirable to maintain the association of the group members so that they perpetually behave as single speaker (for a left-right stereo pair) or otherwise behave together as designated for the group members. Breaking up the group is not a desirable option. The present disclosure helps to ensure that if a user presses the Bluetooth or aux input button on a group slave speaker the relationship between the group members is maintained, and the expected response, from the user's perspective, is provided. That is, the user should be able to select any device of the group to receive a Bluetooth or Aux input and the devices should establish the requested connection and maintain the current group configuration and performance.

More generally, in a set of audio playback devices the set master device receives audio data from a source, and distributes the data and control information to other devices of the set, which act as set slave devices under the control of the set master device. Device audio data reception and distribution, and master/slave control, are further described below. If during audio play by the audio playback devices of the set of devices the user desires to use a slave device to receive audio data (e.g., by pairing a Bluetooth or auxiliary source with the slave), in the current system this slave device is removed from the set and acts as a stand-alone device. However, the user may want to maintain the current synchronized play among some or all of the devices of the set. This objective can be accomplished by designating the new audio data recipient as the new set master device, and designating the original master device as a slave. This way, the user can switch audio sources without having to change or reconfigure an existing group or zone of synchronized devices.

Figure 1:
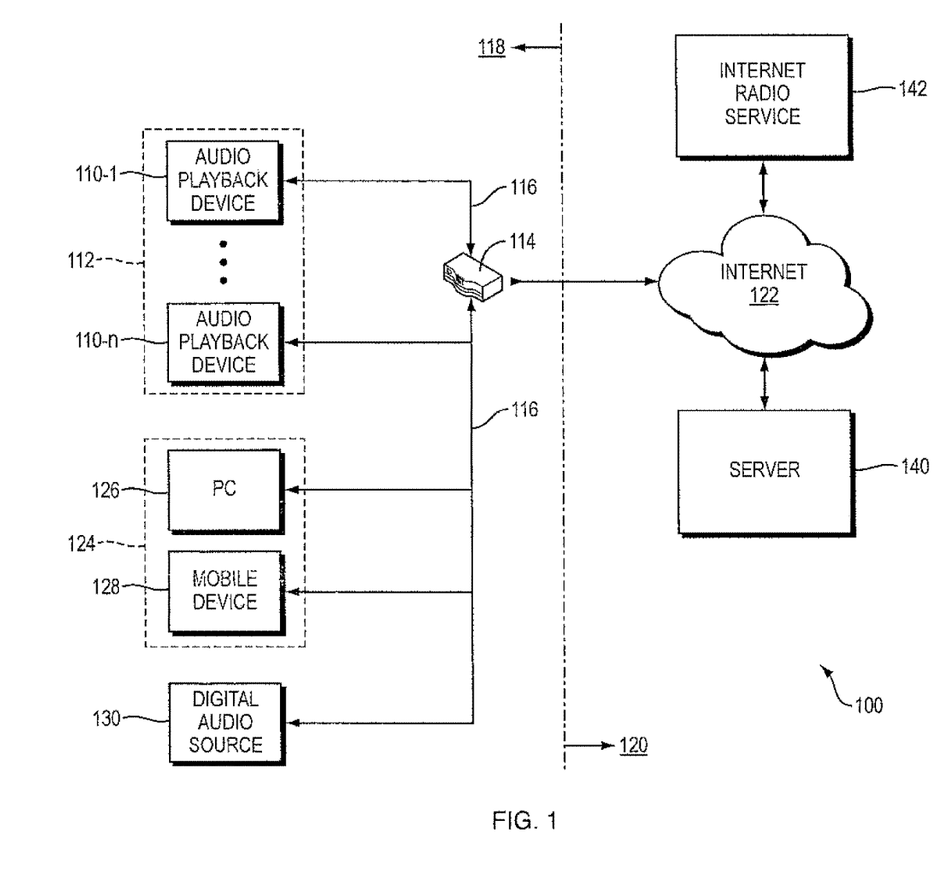
FIG. 1 is schematic block diagram of an audio distribution and playback system.

Audio distribution system 100, FIG. 1, can be used to accomplish a method for distributing audio data to, and synchronizing audio data among, a plurality of audio playback devices that are connected to a network. System 100 can also be used to accomplish a method of dynamically changing the master audio playback device of a zone and/or group of devices. System 100 also includes the audio playback devices and the computer devices that are involved in the subject audio distribution and master device re-designation. System 100 is adapted to deliver digital audio (e.g., digital music). System 100 includes a number of audio playback devices 110-1-110-*n* (collectively referenced as 110), which are among the set of audio output devices 112 of the system. In one non-limiting embodiment, the audio playback devices are identical devices that each include a digital to analog converter that is able to receive digital audio signals and convert them to analog form. The audio playback devices also include an electro-acoustic transducer that receives the analog audio signals and transduces them into sound. The audio playback devices also include a processor. The audio playback devices are connected to one another and also connected to local router/access point 114 via network 116. The audio playback devices are thus able to communicate with one another. Network 116 can be a wired and/or wireless network, and can use known network connectivity methodologies. Network 116 is part of LAN 118 which is connected to wide area network (WAN) 120, in this non-limiting example by connection to Internet 122. LAN 118 also includes one or more separate computing devices 124 and one or more separate local digital audio sources 130. In this non-limiting example the computing devices include a personal computer 126 and a mobile computing device 128 such as a smart phone, tablet or the like. WAN 120 includes server 140 and Internet radio service 142 which can both communicate with the LAN via Internet 122.

One use of system 100 is to play digital audio data, including but not limited to an audio stream, over one or more of the audio playback devices in set 112. The sources of digital audio provide access to content such as audio streams that move over network 116 to the audio playback devices. The sources of such audio streams can include, for example, Internet radio stations and user defined playlists. Each of such digital audio sources maintains a repository of audio content which can be chosen by the user to be played over one or more of the audio playback devices. Such digital audio sources can include Internet-based music services such as Pandora®, Spotify® and vTuner®, for example. Network attached storage devices such as digital audio source 130, and media server applications such as may be found on a mobile computing device, can also be sources of audio data. In a non-limiting example, the user selects the audio source and the playback devices via PC 126 and/or mobile device 128.

When a user has chosen to have an audio stream played on more than one of the audio playback devices of the set, in order for the music to be properly synchronized such that the same tracks are playing synchronously on all of the active audio playback devices there needs to be appropriate and sufficient coordination among all of the active audio playback devices. One manner in which such coordination can be accomplished is to use one of the audio playback devices to control the distribution of audio data to all of the other active audio playback devices that are being used to play content. This device which controls audio data distribution to the other active playback devices can be considered a set master device, and the rest of the active devices (i.e., the rest of the playback devices that are being used to play content) can be considered to be set slave devices. In addition to an audio stream, the set master device also provides control data (e.g., via a control data stream) to at least some of the set slave devices. The control data includes timing information which enables the set slave devices to synchronize playback of the streamed audio content with the set master device. In one example, the control data includes a "play at" time, which corresponds to a time when the playback devices are to begin playback of the streamed audio data. Devices joining the playback set after playback has started may also use the "play at" time to determine where in the stream to begin playback in order to sync up with the other active playback devices in the set.

To help ensure that the playback of the audio content is and remains synchronized, the respective internal clocks of the individual playback devices are synchronized. In principle, such clocks comprise an oscillator and a counter. Clock synchronization of audio playback devices is further described in application Ser. No. 15/087,021, filed on Mar. 31, 2016, the entire disclosure of which is incorporated herein by reference.

In an existing multi-device system, such as disclosed in U.S. Pat. No. 9,078,072, the disclosure of which is incorporated herein by reference, when one or more playback devices are added to an already playing playback device, the result is the formation of a multi-device zone which is managed by the playback device that was initially playing the audio. All of the playback devices are clock synchronized. The audio data that gets distributed to the playback devices are time-stamped, and due to clock synchronization the audio is played synchronously at all playback devices. The manager of the zone is the zone master device, and its main functions are audio control and audio distribution. The remaining device(s) in the zone are referred to as zone slaves. The device which is responsible for the clock synchronization is called the clock master. The clock master is part of the same network as all the other devices, but may or may not be part of the same zone. In some cases the clock master can be the same as the zone master device, but it need not be.

The main roles of the zone audio master are audio distribution to and audio control of the slaves. The zone audio master establishes secure connections to each of the slaves in the zone. This connection may or may not be over the home router or access point, and the connection between each zone slave and the zone master may or may not be unique (i.e., the connection can be unicast or multicast). Time-stamped audio packets are then distributed over each of these connections to the individual zone slaves. The zone slaves use the time-stamps to play audio at the correct time. Apart from an audio distribution channel, there is also a control channel which is established between the zone audio master and the zone slave devices. The control channel is used to send out audio control messages. When playback is requested at the zone audio master, the zone audio master starts buffering the data before starting playback. During this time audio is also distributed to the zone slaves through the audio distribution channel.

Two or more of the zone audio playback devices can be configured as a coordinated group, for example for left-right stereo pair playback, or as multiple speakers of a surround sound system. A group can exist independently of a zone. The members of the group are preferably selected by the user, for example via a user interface (UI) of a smartphone application that can be used to set-up the zone and/or the group. The group master device can in one non-limiting example be pre-established as either the left or right device of the group, or as a defined device of the surround sound group of devices. In a group, the devices of the group play different audio data from one another, at least some of the time. An example is depicted in audio distribution system 200, FIG. 2, with a zone comprising audio playback devices 202, 204, 206, 210 and 212. In such a "mixed mode" configuration (i.e., a configuration with a synchronized group that is part of a larger zone of devices), the roles of zone audio master and clock master still exist. However, there is an additional role of group master, which is performed by one of the devices of the group, and group slave(s), which is performed by the rest of the member devices of the group. In the present non-limiting example, device 210 is the group master of stereo pair group 208 that includes devices 210 and 212, one of which is the left speaker and the other of which is the right speaker.

Figure 2:
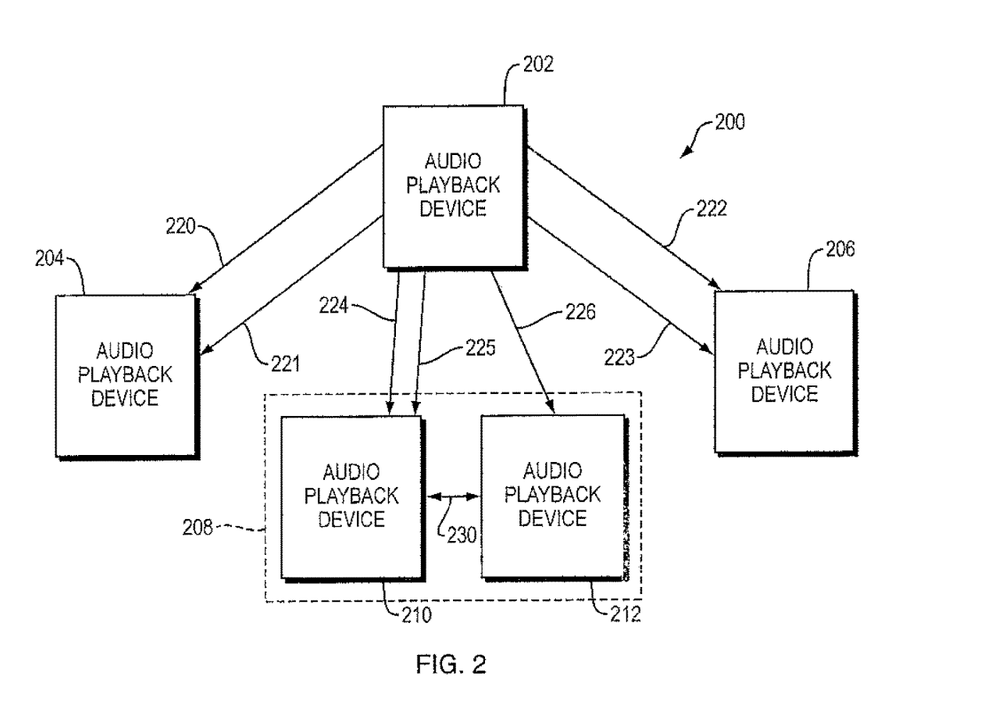
FIG. 2 is a schematic block diagram of a mixed-mode audio distribution and playback system.

Group master 210 is the audio control master of left-right group 208. Group master device 210 can be either the left or the right device of group 208. The other device of the group 208 (i.e., device 212) is the group slave to the group master, much in the same way all devices in a regular multi-device zone configuration are control zone slaves to the zone audio master. The main functionality of the group master is to decide when the devices of the group start playback. This decision is made when the group master receives a play command (e.g., from the zone audio master) and (i) all of the devices of the group have reached minimum required buffer depth to start playback, (ii) the device package hardware is ready on all group devices, and (iii) the clocks on all group devices are synced to the clock master. Both the devices in group 208 start playback simultaneously as soon as the group master 210 issues a command to do so based on these requirements. This is further described below.

The role of the zone audio master 202 is the same for this mixed-mode configuration 200 as it is for the regular configuration disclosed in U.S. Pat. No. 9,078,072. In the case where one device of group 208 is the zone audio master (i.e., the controller of the zone), any device of the group can be the zone audio master.

In the mixed-mode configuration illustrated by system 200, FIG. 2, the audio control between regular zone slaves 204 and 206 (i.e., the slaves that are not part of group 208) and the zone audio master remains unchanged. Control is accomplished over control channels 220 and 222. When the devices of group 208 are part of the zone of devices connected to the zone audio master, the master 210 of group 208 acts as a control slave to the zone audio master 202 (via control channel 224), and receives and processes all control commands. However, the group slave(s) (e.g., device 212) is a control slave to the group master 210 and only receives control commands from group master 210 (via control channel 230), as mentioned above. Thus, group slaves do not receive control commands from the zone master device.

Zone master 202 preferably distributes audio to all other devices of the zone, including all devices of the group 208, although audio distribution to the devices of the zone and the group could be handled in other manners, such as from the source directly to each active device. Such audio distribution can be accomplished using any currently known or future-developed data distribution technology, including but not limited to Bluetooth, WiFi, and via a local access point such as a home router. In this non-limiting example, audio channels 221, 223, 225 and 226 are used for distribution of audio from zone master 202 to each other device. Also, preferably but not necessarily, all devices of group 208 receive all of the audio data that is to be played on all of the devices of the group. Thus both of devices 210 and 212 receive all of the left and right audio data (or in the case of a different group such as a surround sound group, each of the devices of the group receives all of the data for the entire group). This enables additional functionality, such as custom equalization and down-mix for the group, which govern how the audio will be played back on each of the devices.

In a group-only configuration where all devices are part of a group, the group master is the only master, and functions in the same manner as does the zone master as described above. All of the other group members are group slaves that receive audio data and control from the group master.

The preferred steps involved in synchronizing audio play among several audio playback devices which include a zone and/or group of devices as described above, are disclosed in U.S. patent application Ser. No. 15/212,246 filed on Jul. 17, 2016, the entire contents of which are incorporated herein by reference. Accordingly, synchronization is not further described herein.

Figure 3:
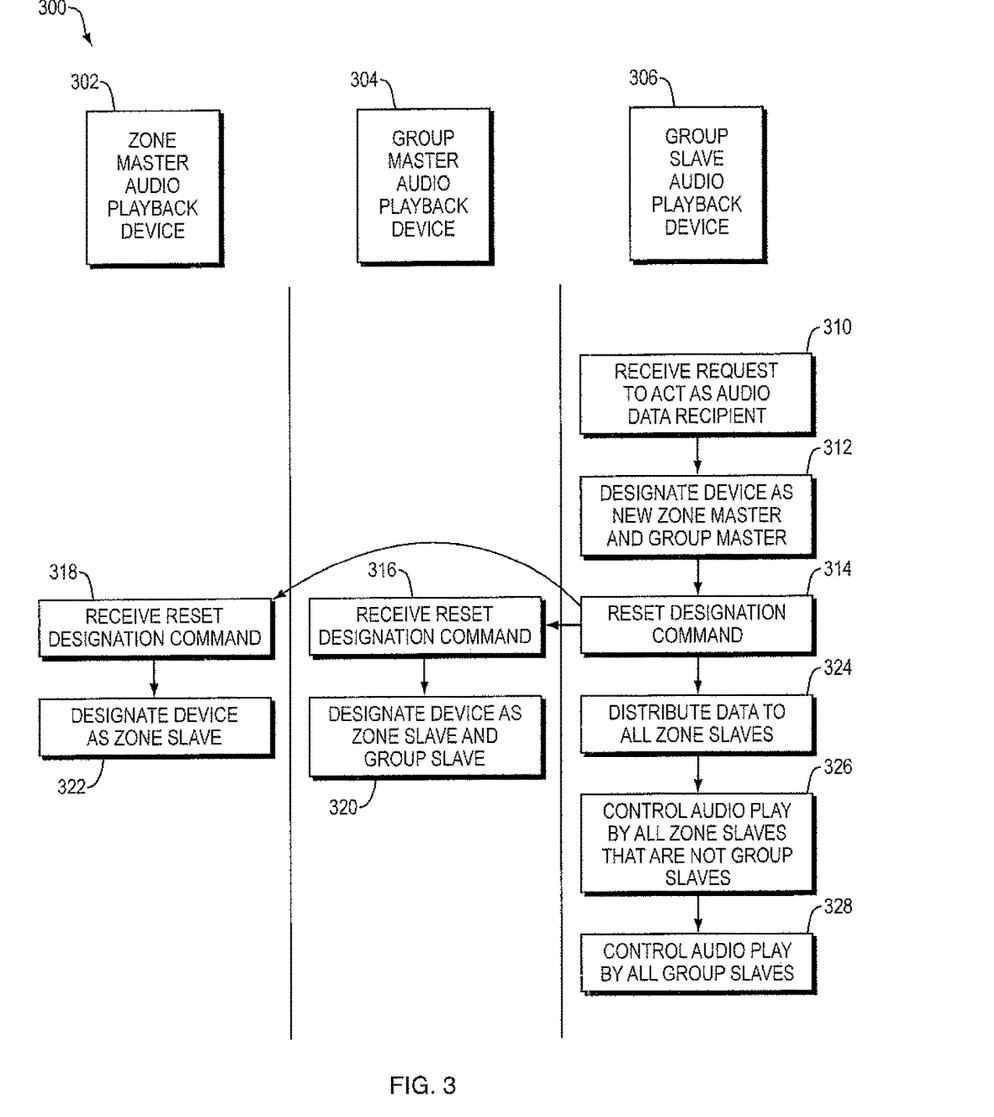
FIG. 3 is a swim lane diagram illustrating steps of dynamically changing the master audio playback device of a zone and group of audio playback devices.

Referring to FIG. 3, three swim lanes are shown in swim-lane diagram 300. FIG. 3 illustrates a mixed mode configuration with a group within a larger zone of devices. Diagram 300 includes lane 302 that relates to the master audio playback device of the zone of such devices (e.g., device 202, FIG. 2), lane 304 that relates to the group master audio playback device (e.g., device 210, FIG. 2), and lane 306 that relates to the group slave audio playback device(s) (e.g., device 212, FIG. 2). If during audio play by the zone audio playback devices (devices 302, 304 and 306 in this example) the user desires to switch audio sources and use a slave device to receive audio data (e.g., by pairing a Bluetooth source with the slave), while still maintaining the current synchronized play among all of the devices of the zone, and maintaining the desired association of the members of the group, the new audio data recipient is re-designated as the new master device, and the original master device is re-designated as a slave device. This way, the user can switch audio sources without having to change or reconfigure an existing zone and/or group of synchronized devices.

An example is illustrated in FIG. 3. At step 310, group slave device 306 receives a request to act as an audio data recipient. This request can come in different forms. For example, for a Bluetooth-enabled audio playback device the user may elect to stream to the slave from a Bluetooth source such as a smartphone. Or, the user may select the auxiliary input of a slave audio playback device that includes such functionality. When request 310 is received, the new data recipient device 306 is designated as the new zone master device and as the new group master device, step 312. In some systems, the zone master is by default the device receiving audio data, and in such systems this re-designation of the slave as the new master will occur by default when it is selected to receive audio data.

In order to maintain the integrity of the zone such that synchronized audio continues to play in the zone (and in the group, if a group is present as in the example of FIG. 3), the rest of the devices of the zone need to be designated as zone slaves, and the rest of the devices of the group need to be designated as group slaves. In one non-limiting example this re-designation of devices 302 and 304 is accomplished by new master device 306 sending a reset designation command, step 314. This command can be sent over the existing control channels. The reset command is received by device 304, step 316 and is received by device 302, step 318. When the processors of devices 304 and 302 receive this command the designations of devices 304 and 302 are changed to zone slave, steps 320 and 322, respectively. Also, the command causes the original zone master device to disconnect from its current audio source. The zone has thus been reconfigured but still has a single master device that receives audio data from the new audio source, and two slave devices that receive their audio data from the new zone master. Also, since in this case there is a group that includes synchronized devices 304 and 306, the group is maintained by also designating device 304 as a new group slave device.

Once the reconfiguration of the zone and the group(s) (if one or more groups are present in the zone) is complete, operation of the system returns to normal wherein the new zone master (device 306) receives audio data and distributes it to all the zone slaves, step 324. Also, the zone master provides control information to all zone slaves that are not slaves in a group, step 326. The group master (also device 306 in this example) provides audio play control information to all group slaves, step 328.

In a case in which the set includes only a group (i.e., where there is no zone), the group master controls both audio distribution and audio play control of the rest of the devices, which are all group slaves. If a group slave is later selected to receive audio this slave is designated as the new group master and the original group master becomes a group slave. The other original group slaves remain as group slaves.

Figure 4A:
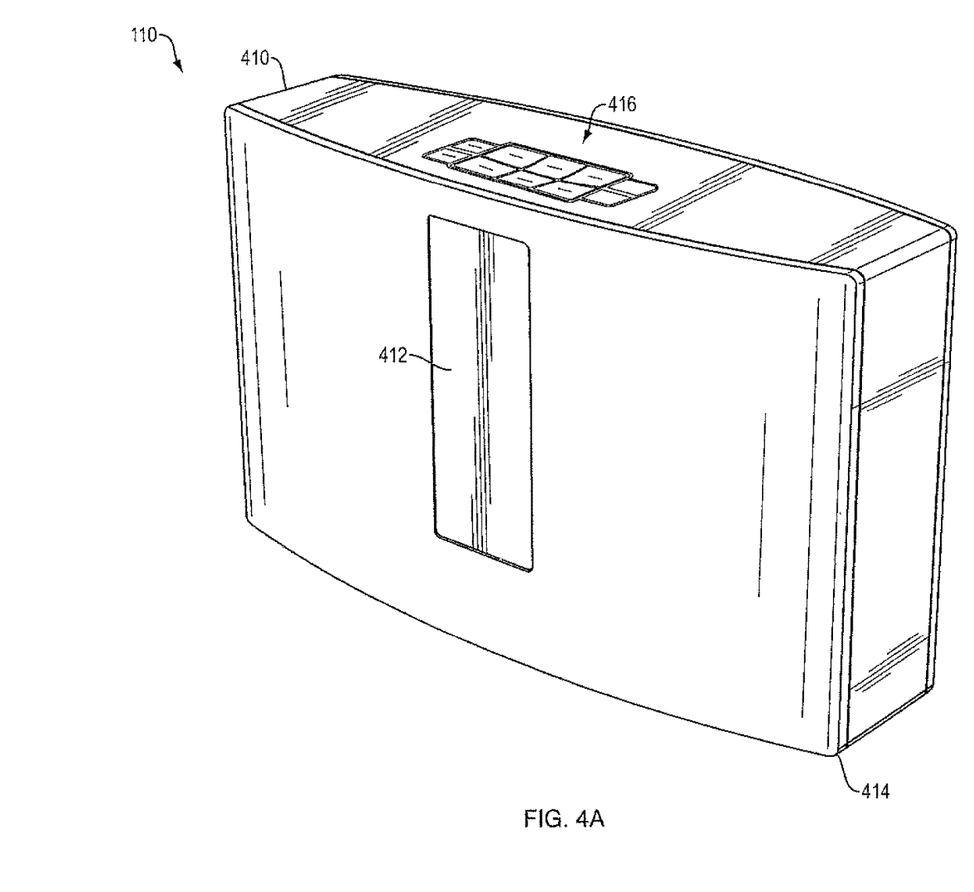
FIGS. 4A and 4B are perspective and top plan views, respectively, of an exemplary audio playback device of the systems of FIGS. 1 and 2.
Figure 4B:
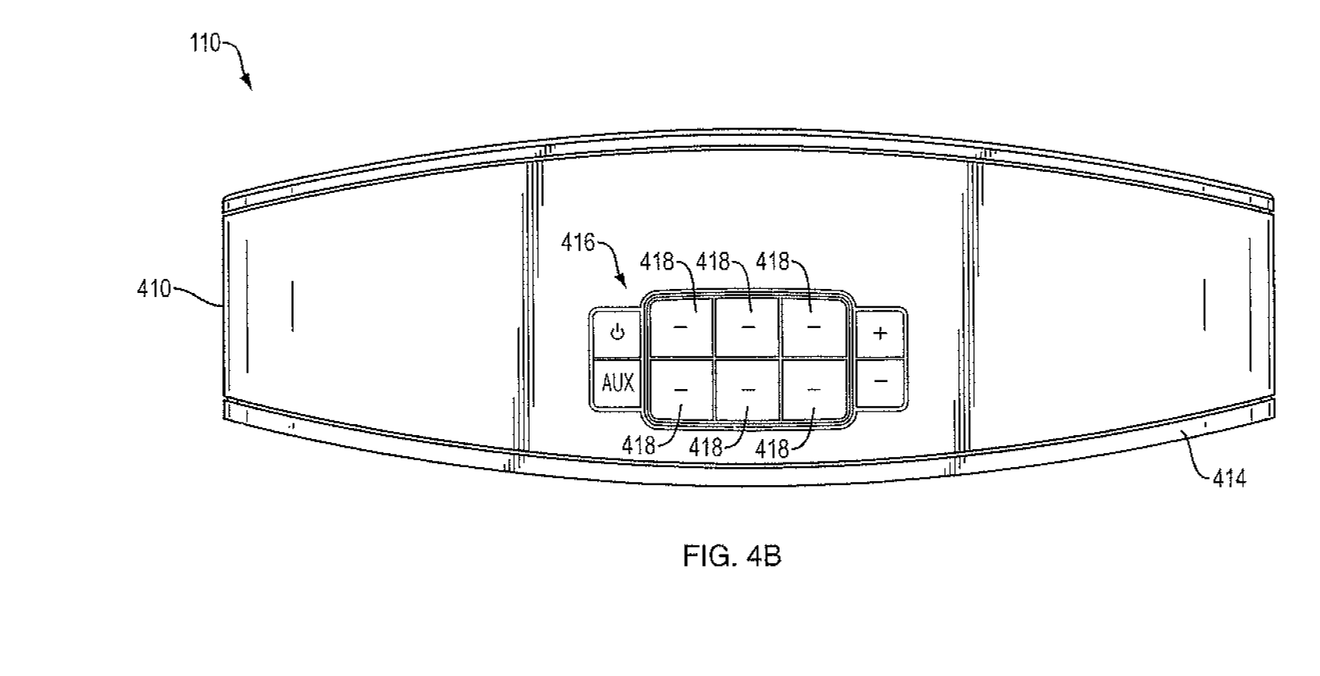
Figure 4C:
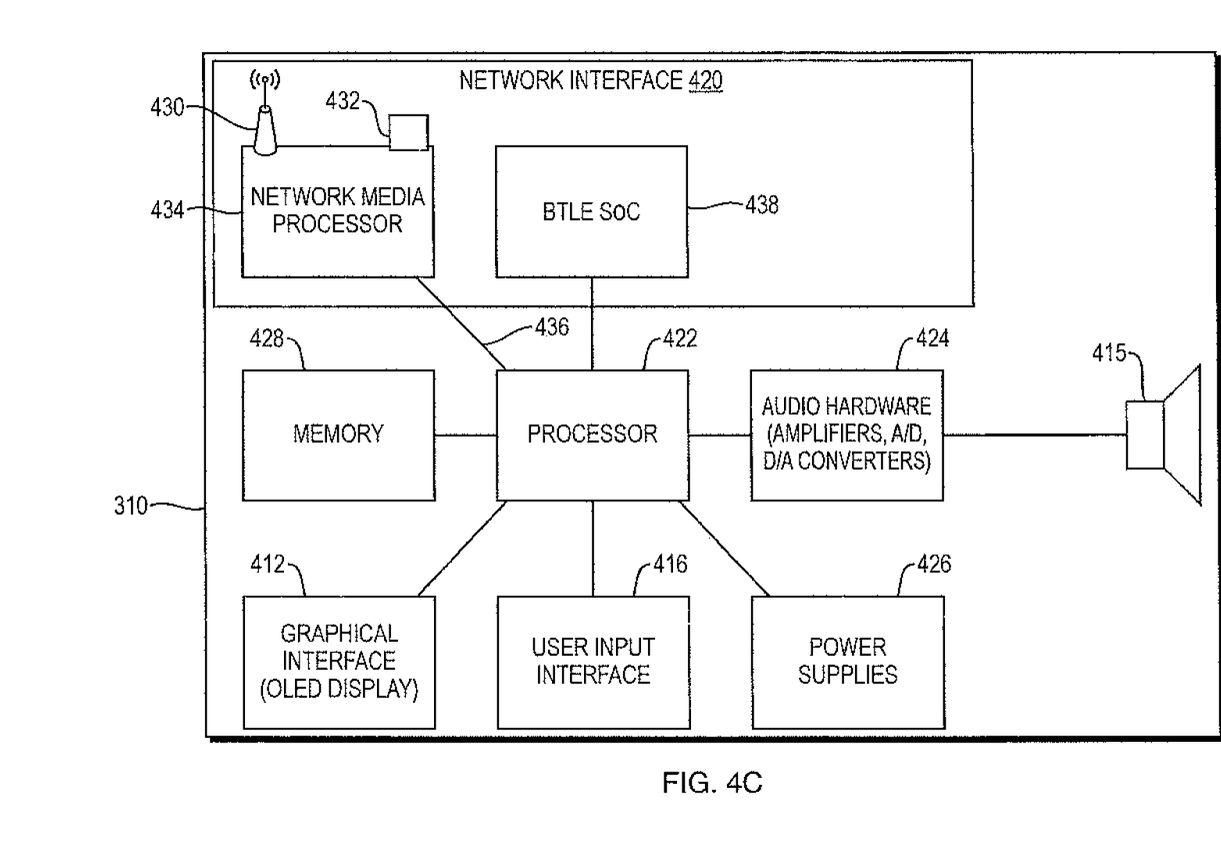
FIG. 4C is a block diagram of the audio playback device of FIGS. 4A and 4B.

An exemplary audio playback device 110 will now be described in greater detail with reference to FIGS. 4A through 4C. Referring to FIG. 4A, an audio playback device 110 includes an enclosure 410 and on the enclosure 410 there resides a graphical interface 412 (e.g., an OLED display) which can provide the user with information regarding currently playing ("Now Playing") music and information regarding the presets. A screen 414 conceals one or more electro-acoustic transducers 415 (FIG. 4C). The audio playback device 110 also includes a user input interface 416. As shown in FIG. 4B, the user input interface 416 includes a plurality of preset indicators 418, which are hardware buttons in the illustrated example. The preset indicators 418 (numbered 1-6) provide the user with easy, one press access to entities assigned to those buttons. That is, a single press of a selected one of the preset indicators 418 will initiate streaming and rendering of content from the assigned entity. Buttons can also be used for Bluetooth pairing and connectivity with a Bluetooth-enabled source and/or for auxiliary data input.

The assigned entities can be associated with different ones of the digital audio sources such that a single audio playback device 110 can provide for single press access to various different digital audio sources. In one example, the assigned entities include at least (i) user-defined playlists of digital music and (ii) Internet radio stations. In another example, the digital audio sources include a plurality of Internet radio sites, and the assigned entities include individual radio stations provided by those Internet radio sites.

Notably, the preset indicators 418 operate in the same manner, at least from a user's perspective, regardless of which entities are assigned and which of the digital audio sources provide the assigned entities. That is, each preset indicator 418 can provide for single press access to its assigned entity whether that entity is a user-defined playlist of digital music provided by a Bluetooth device or an NAS device, or an Internet radio station provided by an Internet music service, as two non-limiting examples.

With reference to FIG. 4C, the audio playback device 110 also includes a network interface 420, a processor 422, audio hardware 424, power supplies 426 for powering the various audio playback device components, and memory 428. Each of the processor 422, the graphical interface 412, the network interface 420, the audio hardware 424, the power supplies 426, and the memory 428 are interconnected using various buses, and several of the components may be mounted on a common motherboard or in other manners as appropriate.

The network interface 420 provides for communication between the audio playback device 110, the remote server (item 140, FIG. 1), the audio sources and other audio playback devices 110 via one or more communications protocols. The network interface 420 may provide either or both of a wireless interface 430 and a wired interface 432. The wireless interface 430 allows the audio playback device 110 to communicate wirelessly with other devices in accordance with a communication protocol such as such as IEEE 802.11 b/g. The wired interface 432 provides network interface functions via a wired (e.g., Ethernet) connection.

In some cases, the network interface 420 may also include a network media processor 434 for supporting Apple AirPlay® (a proprietary protocol stack/suite developed by Apple Inc., with headquarters in Cupertino, Calif., that allows wireless streaming of audio, video, and photos, together with related metadata between devices). For example, if a user connects an AirPlay® enabled device, such as an iPhone or iPad device, to the LAN 118, the user can then stream music to the network connected audio playback devices 110 via Apple AirPlay®. A suitable network media processor is the DM870 processor available from SMSC of Hauppauge, N.Y. The network media processor 434 provides network access (i.e., the Wi-Fi network and/or Ethernet connection can be provided through the network media processor 434) and AirPlay® audio. AirPlay® audio signals are passed to the processor 422, using the I2S protocol (an electrical serial bus interface standard used for connecting digital audio devices), for downstream processing and playback. Notably, the audio playback device 110 can support audio-streaming via AirPlay® and/or DLNA's UPnP protocols, and all integrated within one device.

All other digital audio coming from network packets comes straight from the network media processor 434 through a USB bridge 436 to the processor 422 and runs into the decoders, DSP, and eventually is played back (rendered) via the electro-acoustic transducer(s) 415.

The network interface 420 can also include a Bluetooth low energy (BTLE) system-on-chip (SoC) 438 for Bluetooth low energy applications (e.g., for wireless communication with a Bluetooth enabled controller (not shown)). A suitable BTLE SoC is the CC2540 available from Texas Instruments, with headquarters in Dallas, Tex.

Streamed data pass from the network interface 420 to the processor 422. The processor 422 can execute instructions within the audio playback device (e.g., for performing, among other things, digital signal processing, decoding, and equalization functions), including instructions stored in the memory 428. The processor 422 may be implemented as a chipset of chips that include separate and multiple analog and digital processors. The processor 422 may provide, for example, for coordination of other components of the audio playback device 110, such as control of user interfaces, applications run by the audio playback device 110. A suitable processor is the DA921 available from Texas Instruments.

The processor 422 provides a processed digital audio signal to the audio hardware 424 which includes one or more digital-to-analog (D/A) converters for converting the digital audio signal to an analog audio signal. The audio hardware 424 also includes one or more amplifiers which provide amplified analog audio signals to the electroacoustic transducer(s) 415 for playback. In addition, the audio hardware 424 may include circuitry for processing analog input signals to provide digital audio signals for sharing with other devices in the acoustic system 100.

The memory 428 may include, for example, flash memory and/or non-volatile random access memory (NVRAM). In some implementations, instructions (e.g., software) are stored in memory 428. The instructions, when executed by one or more processing devices (e.g., the processor 422), perform one or more processes, such as those described above (e.g., with respect to FIG. 3). The instructions can also be stored by one or more storage devices, such as one or more computer- or machine-readable mediums (for example, the memory 428, or memory on the processor). The instructions may include instructions for performing decoding (i.e., the software modules include the audio codecs for decoding the digital audio streams), as well as digital signal processing and equalization.

Elements of figures are shown and described as discrete elements in a block diagram. These may be implemented as one or more of analog circuitry or digital circuitry. Alternatively, or additionally, they may be implemented with one or more microprocessors executing software instructions. The software instructions can include digital signal processing instructions. Operations may be performed by analog circuitry or by a microprocessor executing software that performs the equivalent of the analog operation. Signal lines may be implemented as discrete analog or digital signal lines, as a discrete digital signal line with appropriate signal processing that is able to process separate signals, and/or as elements of a wireless communication system.

When processes are represented or implied in the block diagram, the steps may be performed by one element or a plurality of elements. The steps may be performed together or at different times. The elements that perform the activities may be physically the same or proximate one another, or may be physically separate. One element may perform the actions of more than one block. Audio signals may be encoded or not, and may be transmitted in either digital or analog form. Conventional audio signal processing equipment and operations are in some cases omitted from the drawing.

Embodiments of the systems and methods described above comprise computer components and computer-implemented steps that will be apparent to those skilled in the art. For example, it should be understood by one of skill in the art that the computer-implemented steps may be stored as computer-executable instructions on a computer-readable medium such as, for example, floppy disks, hard disks, optical disks, Flash ROMS, nonvolatile ROM, and RAM. Furthermore, it should be understood by one of skill in the art that the computer-executable instructions may be executed on a variety of processors such as, for example, microprocessors, digital signal processors, gate arrays, etc. For ease of exposition, not every step or element of the systems and methods described above is described herein as part of a computer system, but those skilled in the art will recognize that each step or element may have a corresponding computer system or software component. Such computer system and/or software components are therefore enabled by describing their corresponding steps or elements (that is, their functionality), and are within the scope of the disclosure.

A number of implementations have been described. Nevertheless, it will be understood that additional modifications may be made without departing from the scope of the inventive concepts described herein, and, accordingly, other implementations are within the scope of the following claims.

For example, the concepts described above work not only with dedicated speaker packages, such as illustrated in FIGS. 4A-4C, but also with computers, mobile devices, and other portable computing devices that can receive digital audio data and transduce it into sound.

What is claimed is:

1. A method for dynamically changing the master audio playback device of a set comprising at least two audio playback devices, wherein one audio playback device of the set is a first set master audio playback device that is configured to receive audio data from an audio data source and send the received audio data to at least one other slave audio playback device of the set, wherein the at least one other slave audio playback devices of the set is configured to receive audio data only from the master audio playback device and not from the audio data source, the method comprising:
   receiving at a first slave audio playback device of the set the selection of the first slave audio playback device of the set as a new recipient of audio data from the audio data source; and
   in response to receiving at the first slave audio playback device of the set the selection of the first slave audio playback device of the set as the new recipient of audio data from the audio data source, designating the first slave audio playback device of the set as a new set master audio playback device; and
   designating the first set master audio playback device as a new slave audio playback device;
   wherein the new set master audio playback device is configured to receive audio data from the audio data source and send the received audio data to the new slave audio playback device, wherein the new slave audio playback device is configured to receive audio data only from the new set master audio playback device and not from the audio data source.

2. The method of claim 1, wherein the set comprises at least three audio playback devices.

3. The method of claim 1, wherein the set comprises a group comprising at least two group audio playback devices, wherein the group has one group master audio playback device and at least one group slave audio playback device, where the group master audio playback device is configured to control the play of audio by the at least one group slave audio playback device.

4. The method of claim 3, wherein the group comprises a left-right stereo pair of audio playback devices.

5. The method of claim 3, wherein the group comprises multiple surround sound audio playback devices.

6. The method of claim 3, wherein the first slave audio playback device comprises a group slave audio playback device.

7. The method of claim 6, wherein the first slave audio playback device is designated as both the new set master audio playback device and the new group master audio playback device.

8. The method of claim 7, wherein the new set master audio playback device is configured to distribute audio data to all other audio playback devices of the set, and wherein the group master audio playback device is configured to control the play of audio by all group slave audio playback devices.

9. The method of claim 1, wherein the first set master is configured to control the play of audio data that originates from a first audio data source, and the selection of the first slave audio playback device of the set as the new recipient of audio data comprises selection of audio data from a second audio data source that differs from the first audio data source, and the new set master device is configured to control the play of audio data from the second audio data source.

10. The method of claim 9, wherein the second audio data source comprises a Bluetooth audio data stream from a Bluetooth-enabled source device.

11. The method of claim 10, wherein Bluetooth audio data is distributed by the new set master audio playback device to all set slave audio playback devices.

12. The method of claim 11, wherein the audio data is distributed to the set slave audio playback devices by one of Bluetooth, WiFi, and via a local access point.

13. The method of claim 9, wherein the second audio data source comprises an auxiliary audio data input.

14. The method of claim 9, wherein the first slave audio playback device comprises a user interface comprising a user-operated switch that when operated initiates a Bluetooth connection between the first slave audio playback device and the second audio data source.

* * * * *